(12) United States Patent
Yasuda et al.

(10) Patent No.: US 12,337,952 B2
(45) Date of Patent: Jun. 24, 2025

(54) FLIGHT VEHICLE

(71) Applicant: KAWASAKI JUKOGYO KABUSHIKI KAISHA, Kobe (JP)

(72) Inventors: Hidemasa Yasuda, Kobe (JP); Tomoka Tsujiuchi, Kobe (JP); Yuichi Kumamoto, Kobe (JP); Akio Ochi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/669,917

(22) Filed: May 21, 2024

(65) Prior Publication Data

US 2024/0300637 A1    Sep. 12, 2024

Related U.S. Application Data

(63) Continuation of application No. PCT/JP2022/041908, filed on Nov. 10, 2022.

(30) Foreign Application Priority Data

Nov. 24, 2021 (JP) ................... 2021-189912

(51) Int. Cl.
  *B64C 23/06* (2006.01)
  *B64C 21/02* (2006.01)
  *B64C 27/04* (2006.01)
  *B64C 27/32* (2006.01)

(52) U.S. Cl.
  CPC ............. *B64C 23/06* (2013.01); *B64C 21/02* (2013.01); *B64C 27/04* (2013.01); *B64C 27/32* (2013.01)

(58) Field of Classification Search
  CPC .......... B64C 23/00; B64C 23/06; B64C 7/00; B64C 21/02; B64C 27/20
  See application file for complete search history.

(56) References Cited

U.S. PATENT DOCUMENTS

| | | | | |
|---|---|---|---|---|
| 3,008,671 A | * | 11/1961 | Schneiter | B64C 7/00 |
| | | | | 244/17.27 |
| 3,130,942 A | * | 4/1964 | Fradenburg | B64C 21/025 |
| | | | | 244/17.11 |
| 3,331,444 A | * | 7/1967 | Toner | B64C 7/00 |
| | | | | D12/327 |
| 10,232,929 B2 | | 3/2019 | Bowles et al. | |

(Continued)

*Primary Examiner* — Joshua J Michener
*Assistant Examiner* — Colin Zohoori
(74) *Attorney, Agent, or Firm* — XSENSUS LLP (57) ABSTRACT

A flight vehicle includes a rotor shaft projecting upward from a body; a rotor head connected to the rotor shaft; and a pair of plate structures located at the upper side of the body and extending in a front-rear direction at right and left sides of the rotor shaft. Each of the pair of plate structures includes a front end, a rear end, an inner surface facing inward in a left-right direction, and an outer surface facing outward in the left-right direction. The front ends of the pair of plate structures are located away from each other in the left-right direction. The rear ends of the pair of plate structures are located away from each other in the left-right direction. During forward flight, pressure at a side where the outer surface is located becomes lower than pressure at a side where the inner surface is located.

14 Claims, 9 Drawing Sheets (56) References Cited

U.S. PATENT DOCUMENTS

| | | | |
|---|---|---|---|
| 2009/0304511 A1* | 12/2009 | Brannon, III | B64C 21/10 |
| | | | 416/179 |
| 2014/0030103 A1* | 1/2014 | Matalanis | B64C 7/00 |
| | | | 416/223 R |
| 2016/0121997 A1* | 5/2016 | Alfano | B64C 13/16 |
| | | | 244/17.11 |
| 2017/0096212 A1* | 4/2017 | Florea | B64C 7/00 |
| 2017/0225772 A1* | 8/2017 | Min | B64C 7/00 |
| 2018/0281932 A1* | 10/2018 | Wake | B64C 27/10 |
| 2018/0305003 A1* | 10/2018 | Hunter | F16J 15/50 |
| 2019/0329864 A1* | 10/2019 | Scannell | B64C 27/04 |
| 2021/0276690 A1* | 9/2021 | Witt | B64C 27/10 |

\* cited by examiner

FLIGHT VEHICLE

CROSS-REFERENCE TO RELATED APPLICATIONS

The present application is a bypass continuation of PCT Filing PCT/JP2022/041908, filed Nov. 10, 2022, which claims priority to JP2021-189912, filed Nov. 24, 2021, both of which are incorporated by reference in their entirety.

BACKGROUND ART

Description of the Related Art

Air resistance is generated when a rotary wing flight vehicle, such as a helicopter, performs forward flight. The air resistance limits a maximum speed and deteriorates fuel efficiency. A fairing that reduces resistance generated at a rotor shaft projecting upward from a body of a helicopter is known. The fairing covers the rotor shaft in a space between the body and a rotor head. Moreover, the fairing has a streamline shape that tapers toward a rear side.

SUMMARY OF THE INVENTION

A flight vehicle according to one aspect of the present disclosure includes: a body; a rotor shaft projecting upward from the body; a rotor head connected to the rotor shaft at an upper side of the body; and a pair of plate structures located at the upper side of the body and extending in a front-rear direction at right and left sides of the rotor shaft. Each of the pair of plate structures includes a front end, a rear end, an inner surface facing inward in a left-right direction, and an outer surface facing outward in the left-right direction. The front ends of the pair of plate structures are located away from each other in the left-right direction. The rear ends of the pair of plate structures are located away from each other in the left-right direction. Each of the pair of plate structures has such a shape that during forward flight, pressure at a side where the outer surface is located becomes lower than pressure at a side where the inner surface is located.

DETAILED DESCRIPTION

Hereinafter, an embodiment will be described with reference to the drawings.

Figure 1:
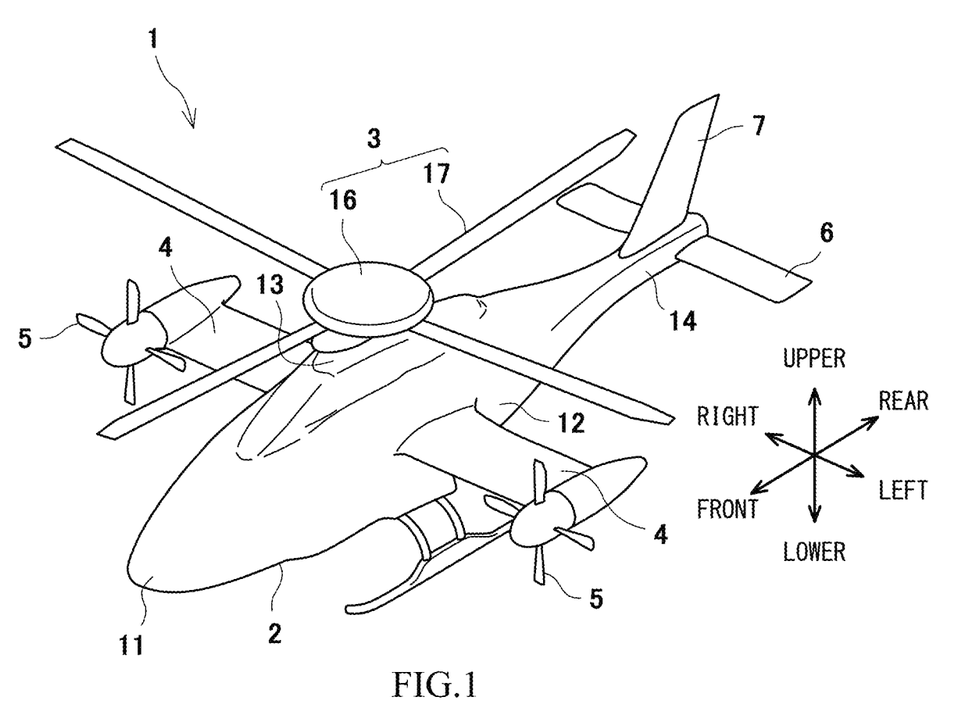
FIG. 1 is a perspective view showing a flight vehicle according to an embodiment.

FIG. 1 is a perspective view showing a flight vehicle 1 according to the embodiment. As shown in FIG. 1, the flight vehicle 1 is a rotary wing flight vehicle including a main rotary wing 3. As one example, the flight vehicle 1 is a compound helicopter including a body 2, the main rotary wing 3, a pair of main wings 4, a pair of propellers 5, a pair of horizontal empennages 6, and a vertical tail 7. The flight vehicle 1 may be a general helicopter that is not the compound helicopter. Moreover, the number of main rotary wings may be two or more.

In the description of the present embodiment, a direction in which a rotor shaft 8 that connects the body 2 and a rotor head 16 of the main rotary wing 3 extends when the flight vehicle 1 is in a landed state is referred to as an upper-lower direction of the flight vehicle 1. In this case, one side of the body 2 where the rotor head 16 is located is referred to as an upper side. Moreover, a surface orthogonal to the upper-lower direction is a horizontal surface. In this case, directions in the horizontal surface are horizontal directions. In addition, in the horizontal surface, a direction in which the pair of main wings 4 extend is referred to as a left-right direction of the flight vehicle 1, and a direction orthogonal to the left-right direction is referred to as a front-rear direction. In this case, one side of a center of the body 2 where the pair of horizontal empennages 6 and the vertical tail 7 are located is referred to as a rear side, and its opposite side is a front side.

The body 2 includes a front portion 11, an intermediate portion 12, a top portion 13, and a rear portion 14. The front portion 11 of the body 2 has a shape that tapers toward the front side. The pair of main wings 4 projecting to the left and right sides from the intermediate portion 12 are connected to the intermediate portion 12 of the body 2. Propellers 5 are located at the respective main wings 4. The top portion 13 of the body 2 has a columnar shape and projects upward from the intermediate portion 12. The rear portion 14 of the body 2 has a shape that tapers toward the rear side. The vertical tail 7 and the pair of horizontal empennages 6 are connected to the rear portion 14 of the body 2. The vertical tail 7 projects upward from the rear portion 14. The pair of horizontal empennages 6 project from the rear portion 14 to the left and right sides.

Figure 2:
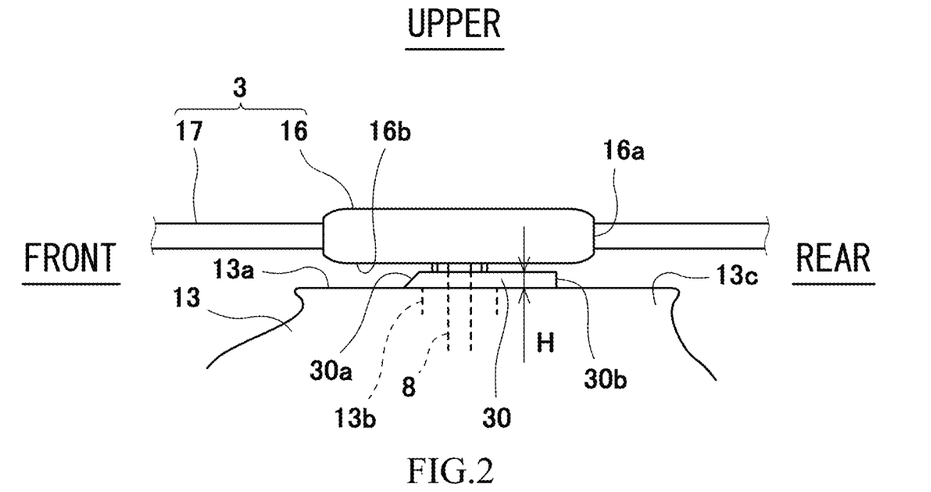
FIG. 2 is a side view showing major components of the flight vehicle of FIG. 1.

The main rotary wing 3 is located at the upper side of the top portion 13 of the body 2. As shown in FIG. 2, the main rotary wing 3 is rotated by the rotor shaft 8 to generate lift. The rotor shaft 8 is driven by a prime mover located inside the body 2. The main rotary wing 3 includes the rotor head 16 and rotor blades 17. The rotor head 16 is connected to the rotor shaft 8 projecting upward from the top portion 13. The rotor blades 17 radially project from the rotor head 16 in substantially the horizontal directions.

The rotor head 16 does not perform parallel displacement or rotation displacement in a fixed coordinate system of the rotor shaft 8. In other words, the rotor head 16 performs only the rotation around an axis of the rotor shaft 8 during the flight.

The rotor head 16 in the present embodiment has a disc shape. The rotor head 16 has a circular shape in a plan view. The rotor head 16 includes, for example, a hub and a hub cap. The hub is connected to the rotor shaft 8. The hub cap has a disc shape covering the entire hub. An outer shape of the rotor head 16 is an outer shape of the hub cap. When the rotor head has a non-circular shape in a plan view, a rotation trajectory of a radially outer end of the rotor head is assumed as the outer shape of the rotor head 16 in terms of fluid dynamics. When the actual rotor head has a circular shape in a plan view, the rotation trajectory of the radially outer end of the rotor head coincides with the outer shape of the actual rotor head 16.

Figure 3:
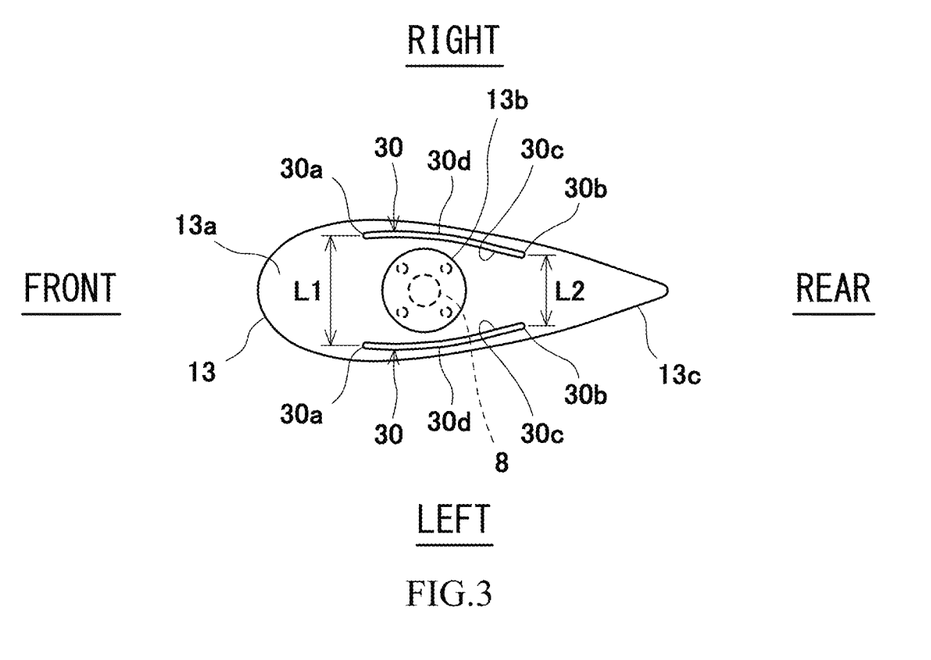
FIG. 3 is a plan view showing major components of the flight vehicle of FIG. 1.

FIG. 2 is a side view showing major components of the flight vehicle 1 of FIG. 1. FIG. 3 is a plan view showing major components of the flight vehicle 1 of FIG. 1. As shown in FIGS. 2 and 3, the top portion 13 of the body 2 includes a flat top surface 13a extending horizontally. An upper opening 13b is defined on the top surface 13a. The rotor shaft 8 extends through the upper opening 13b. The disc-shaped rotor head 16 is located at the upper side of the top surface 13a. The top portion 13 in the present embodiment is longer in the front-rear direction than in the left-right direction. The top portion 13 has a symmetrical shape in the left-right direction in a plan view. The top portion 13 has a streamline shape extending in the front-rear direction in a plan view.

The shape of the top portion 13 is not limited to this. However, especially the shape of the top portion 13 which tapers toward the rear side hardly inhibits the flow generated by a pair of plate structures 30 of the present disclosure as compared to the other shapes. Therefore, this shape is suitably applicable to the pair of plate structures 30. The rotor shaft 8 projects upward from an inside of the body 2 through the upper opening 13b. The rotor head 16 is connected to the rotor shaft 8 at the upper side of the body 2. The top surface 13a is opposed to a lower surface 16b of the rotor head 16 in the upper-lower direction.

The pair of plate structures 30 projecting upward from the top surface 13a are located at the top portion 13. The pair of plate structures 30 are separately located at the left and right sides of the rotor shaft 8. One of the pair of plate structures 30 extends in the front-rear direction at the right side of the rotor shaft 8. The other of the pair of plate structures 30 extends in the front-rear direction at the left side of the rotor shaft 8. The height of each plate structure 30 in the upper-lower direction is smaller than a distance between the top surface 13a and the rotor head 16 in the upper-lower direction. To be specific, the upper end of each plate structure 30 is located lower than the lower surface 16b of the rotor head 16. The lower surface 16b of the rotor head 16 is a surface which is a lower contour of the rotor head 16 and faces downward. The right plate structure 30 and the left plate structure 30 are located symmetrically in the left-right direction with respect to a virtual vertical surface which extends in the front-rear direction through the axis of the rotor shaft 8.

Each of the pair of plate structures 30 is a plate extending in the front-rear direction and including main surfaces facing in the left-right direction. Each plate structure 30 includes a front end 30a, a rear end 30b, an inner surface 30c facing inward in the left-right direction, and an outer surface 30d facing outward in the left-right direction. The pair of plate structures 30 in the present embodiment extend along left-right direction outer edges of the top surface 13a of the top portion 13.

Each plate structure 30 in the present embodiment has a substantially rectangular shape in a side view. Specifically, in a side view, the front end of the plate structure 30 has a tapered shape including a diagonal ridgeline extending from the upper side to the lower side. The rear end 30b of the plate structure 30 extends in a direction perpendicular to the top surface 13a. Moreover, the thickness of the plate structure 30 in the present embodiment is, for example, constant. However, the plate structure 30 is not limited to this and may adopt various shapes. For example, the thickness of the plate structure 30 may change in the front-rear direction. To be specific, the position of the inner surface 30c of the plate structure 30 and the position of the outer surface 30d of the plate structure 30 in a plan view may be independently determined.

The front ends 30a of the pair of plate structures 30 are located away from each other in the left-right direction. The rear ends 30b of the pair of plate structures 30 are located away from each other in the left-right direction. A distance L1 between the front ends 30a of the pair of plate structures 30 in the left-right direction is longer than a distance L2 between the rear ends 30b of the pair of plate structures 30 in the left-right direction.

The front ends 30a of the plate structures 30 are located behind a front end of the top surface 13a. The front ends 30a of the plate structures 30 are located in front of the rotor shaft 8. The rear ends 30b of the plate structures 30 are located in front of a rear end of the top surface 13a. The rear ends 30b of the plate structures 30 are located behind the rotor shaft 8. The top portion 13 includes a rear portion 13c. The rear portion 13c is located behind the rear ends 30b of the plate structures 30. The rear portion 13c of the top portion 13 has a shape that tapers toward the rear side.

The rear ends 30b of the plate structures 30 are located in front of a rear end 16a of the rotation trajectory of the radially outer end of the rotor head 16. In the present embodiment, the front ends 30a of the plate structures 30 are located behind the front end of the rotor head 16. However, the front ends 30a of the plate structures 30 may be located in front of the front end of the rotor head 16. At least a part of each plate structure 30 may overlap the rotor head 16 in a plan view.

Figure 4:
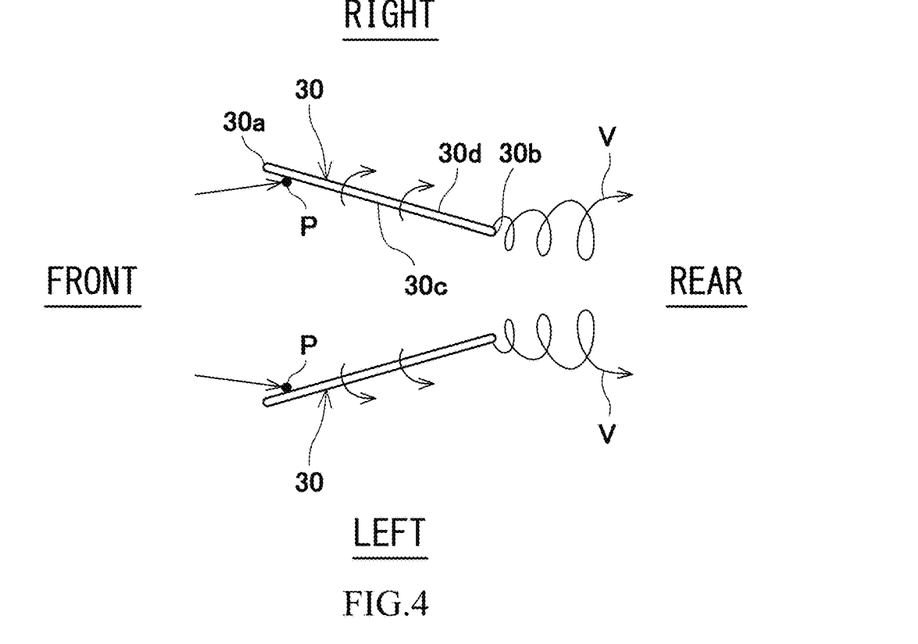
FIG. 4 is a plan view for explaining an air flow around plate structures of FIG. 3.
Figure 5:
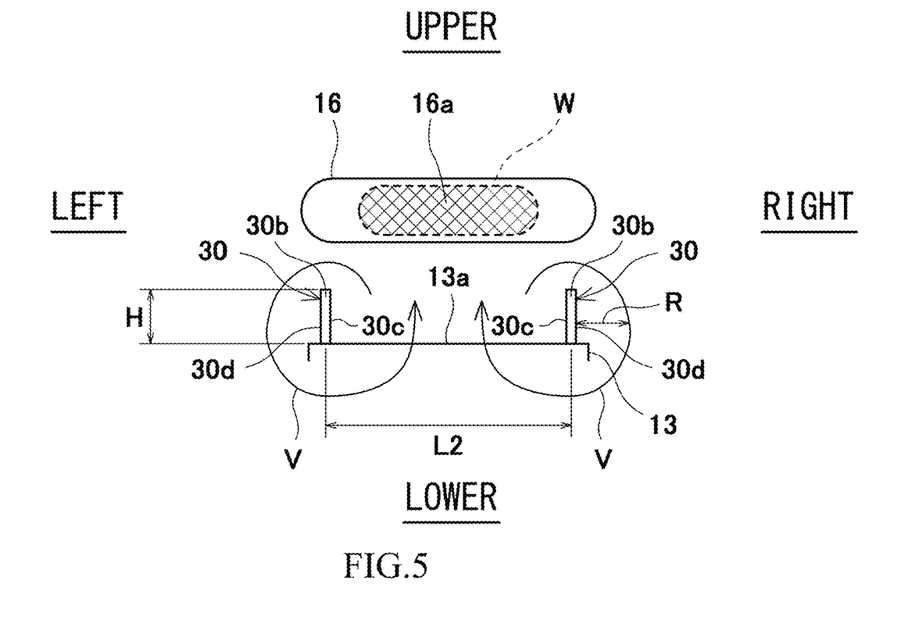
FIG. 5 is a rear view for explaining the air flow around the plate structures of FIG. 4.

FIG. 4 is a plan view for explaining air flow around the plate structures 30 of FIG. 3 during forward flight of the flight vehicle 1. FIG. 5 is a rear view for explaining the air flow around the plate structures 30 of FIG. 4 during the forward flight of the flight vehicle 1. As shown in FIGS. 4 and 5, the inner surface 30c of each plate structure 30 diagonally extends toward an inside in the left-right direction and the rear side. The outer surface 30d of each plate structure 30 diagonally extends toward the inside in the left-right direction and the rear side.

In the present embodiment, the thickness of each plate structure 30 is constant. Therefore, the entire plate structure 30 diagonally extends toward the inside in the left-right direction and the rear side. During the forward flight of the flight vehicle 1, each plate structure 30 has an angle of attack that is not zero with respect to a flow field around the plate structure 30. The plate structure 30 in the present embodiment has an arch shape projecting outward in the left-right direction. However, for ease of explanation, the plate structure 30 has a linear shape in FIG. 4. To be specific, below-described effects can be obtained even when each plate structure 30 has the linear shape shown in FIG. 4.

In the flow field around each plate structure 30 during the forward flight of the flight vehicle 1, a stagnation point P is generated on the inner surface 30c of the plate structure 30, and pressure at a side where the inner surface 30c of the plate structure 30 is located becomes higher than pressure at a side where the outer surface 30d of the plate structure 30 is located. Moreover, in the flow field around the plate structure 30 during the forward flight of the flight vehicle 1, the flow of the air along the outer surface 30d of the plate structure 30 is made to turn diagonally relative to the front-rear direction, and this increases the flow velocity. As a result, the pressure at the side where the outer surface 30d of the plate structure 30 is located becomes low. As above, each plate structure 30 has such a shape that during the forward flight, the pressure at the side where the outer surface 30d is located becomes lower than the pressure at the side where the inner surface 30c is located.

The air having entered between the pair of plate structures 30 from the front side during the forward flight of the flight vehicle 1 flows from the side where the inner surface 30c of each plate structure 30 is located to the side where the outer surface 30d of the plate structure 30 is located, over the upper end of the plate structure 30 in accordance with the pressure difference between the pressure at the side where the inner surface 30c of the plate structure 30 is located and the pressure at the side where the outer surface 30d of the plate structure 30 is located. Thus, when viewed in the front-rear direction, the air flow having flowed through the plate structure 30 generates a vertical vortex V in which the air flows from an outside of the plate structure 30 through a lower side of the plate structure 30 and returns to an inside of the plate structure 30. The air of the vertical vortex V induces the flow from a region located inside the plate structure 30 in the left-right direction to the upper side. This flow passes through a wake region W of the rotor head 16. This suppresses a case where the airflow attaches to the rotor head 16 and flows around the rotor head 16 to the rear side. As a result, a pressure decrease of the wake region W of the rotor head 16 is suppressed.

The distance L2 between the rear ends 30b of the pair of plate structures 30 in the left-right direction is a value that is twice or more and six times or less a maximum height H of the plate structure 30 in the upper-lower direction. A radius of the vertical vortex V which is generated by the plate structure 30 and may flow through the wake region W is represented by R, and a length of the plate structure 30 in the front-rear direction is represented by L. In this case, when an aspect ratio, i.e., H/L, of the plate structure 30 is smaller than one, the radius R is regarded as being substantially equal to the maximum height H. When the aspect ratio, i.e., H/L, of the plate structure 30 is one or more, the radius R is empirically regarded as being equal to the length L, and the range of the distance L2 is defined as being twice or more and six times or less the length L by using "R=L."

The radius R of the vertical vortex V may be defined as a curvature radius of an outer edge of a region where vorticity exists. For example, in a Rankine vortex model, the radius R of the vertical vortex V may be defined as a curvature radius of a line whose speed in a rotational direction is the highest. When the distance L2 is twice or more the radius R, interference between the vertical vortexes V generated behind the left and right plate structures 30 can be suppressed, i.e., a loss generated by collision between vortexes in vortex rotation directions can be suppressed. Moreover, when the distance L2 is six times or less the radius R, the flow in which the left and right vertical vortexes V move upward can be suitably induced. As a result, the flow of the vertical vortexes V can suitably reach the wake region W of the rotor head 16.

Moreover, as shown in FIG. 3, the rear portion 13c of the top portion 13 has a shape that tapers toward the rear side. Therefore, the vertical vortexes V behind the plate structures 30 hardly hit the top portion 13. As a result, the flow in which the vertical vortexes V move upward can be promoted. The positions of the rear ends 30b of the plate structures 30 in the front-rear direction may be the same as or may be located in front of the position of the rear end of the top portion 13 in the front-rear direction.

The following will describe: Example that is a result of simulation in which the flow field around the flight vehicle including the plate structures 30 is analyzed; and Comparative Example that is a result of simulation in which the flow field around a conventional flight vehicle not including the plate structures 30 is analyzed.

Used in the present analysis is a model in which as the main rotary wing, the rotor blades 17 are omitted, and only the disc-shaped rotor head 16 is included. According to the actual main rotary wing, the flow field is locally and momentarily disturbed by the rotor blades, but the global flow field including the circumference of the rotor head 16 is not influenced by the rotor blades. Immediately after the rotor blade passes through the flow field in the vicinity of the rotor head 16, the flow filed converges to the same flow field as when there is no rotor blade. Therefore, even when there is the rotor blade, the flow field around the rotor head 16 becomes the same as the flow field when there is no rotor blade, from the viewpoint of time average.

Figure 6A:
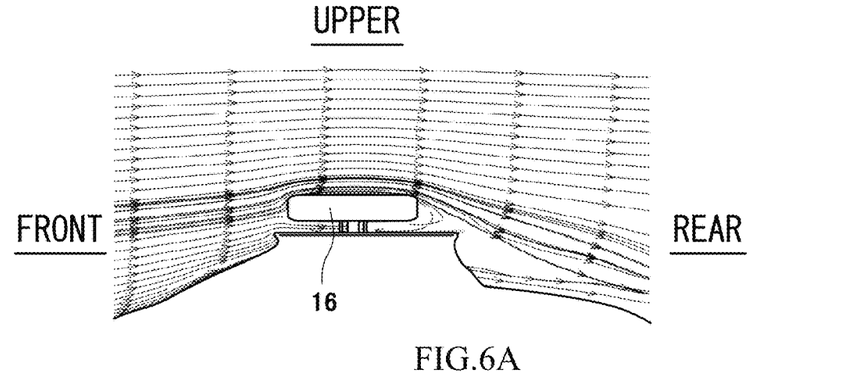
FIG. 6A is a side view showing an analytical result of a streamline distribution of Comparative Example.
Figure 6B:
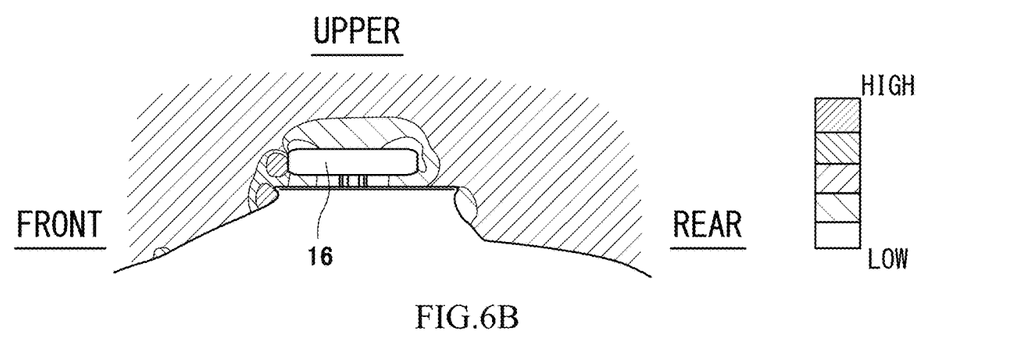
FIG. 6B is a side view showing an analytical result of a pressure distribution of Comparative Example.
Figure 6C:
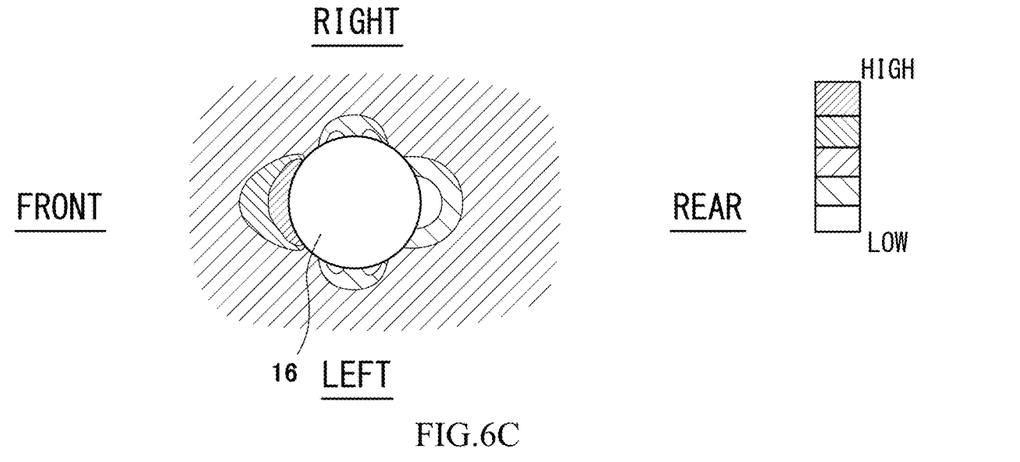
FIG. 6C is a plan view showing the analytical result of the pressure distribution of Comparative Example.

FIG. 6A is a side view showing an analytical result of a streamline distribution of Comparative Example. FIG. 6B is a side view showing an analytical result of a pressure distribution of Comparative Example. FIG. 6C is a plan view showing an analytical result of the pressure distribution of Comparative Example. As shown in FIG. 6A, in Comparative Example, there is the generation of typical wake behind the rotor head 16. As shown in FIGS. 6B and 6C, in Comparative Example, a large pressure decrease occurs in the wake region of the rotor head 16. Therefore, pressure resistance of the rotor head 16 with respect to the forward flight is large.

Figure 7A:
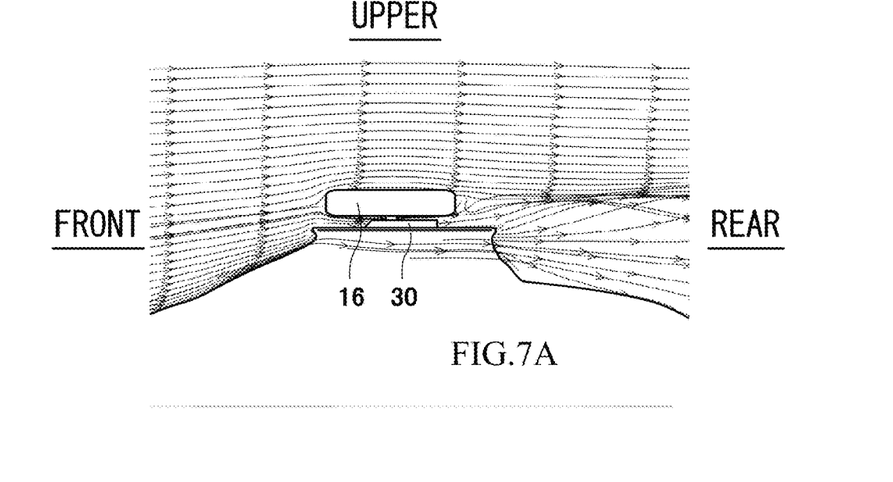
FIG. 7A is a side view showing the analytical result of the streamline distribution of Example.
Figure 7B:
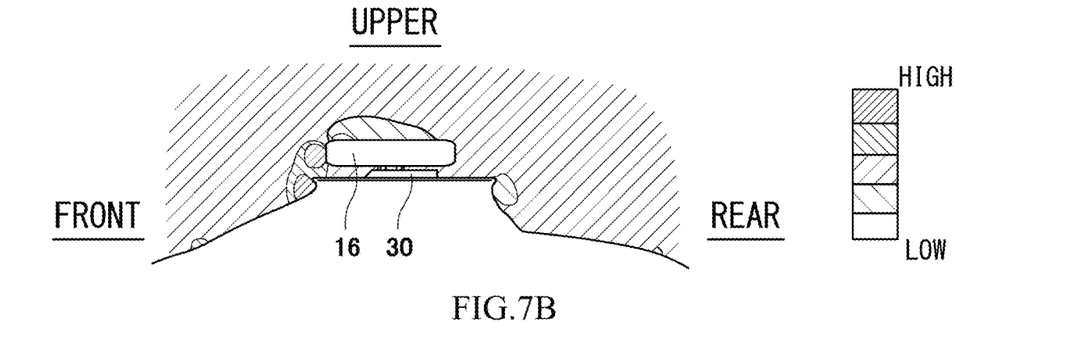
FIG. 7B is a side view showing the analytical result of the pressure distribution of Example.
Figure 7C:
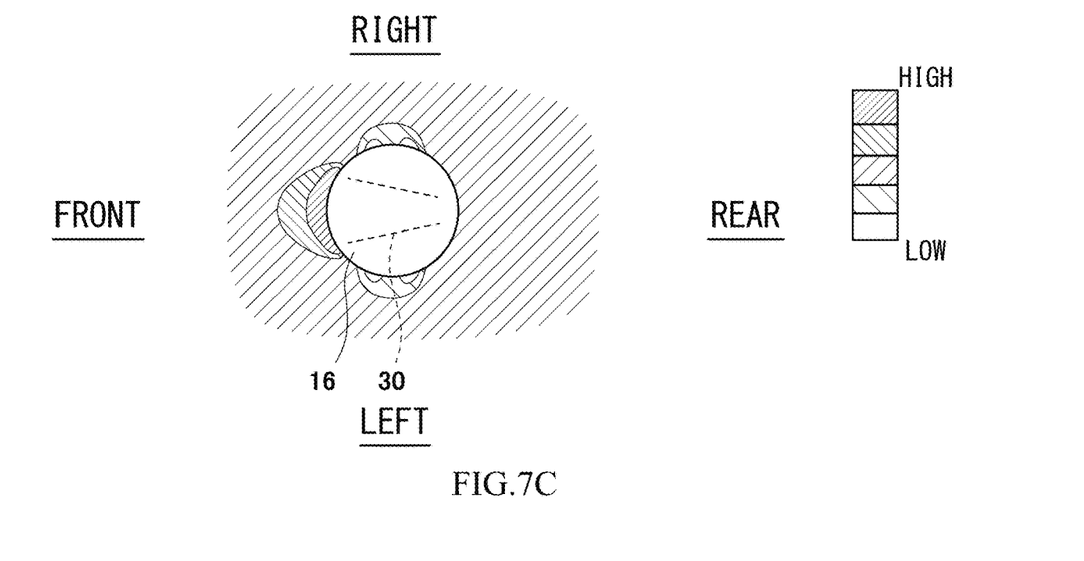
FIG. 7C is a plan view showing the analytical result of the pressure distribution of Example.

FIG. 7A is a side view showing the analytical result of the streamline distribution of Example. FIG. 7B is a side view showing the analytical result of the pressure distribution of Example. FIG. 7C is a plan view showing the analytical result of the pressure distribution of Example. As shown in FIG. 7A, in Example, the air flow having flowed through the plate structures 30 to the rear side flows diagonally upward and flows through the wake region of the rotor head 16. As shown in FIGS. 7B and 7C, in Example, a large pressure decrease does not occur in the wake region of the rotor head 16. Therefore, the pressure resistance of the rotor head 16 with respect to the forward flight is small.

According to the above-described configuration, each plate structure 30 has such a shape that during the forward flight of the flight vehicle 1, the pressure at the side where the outer surface 30d is located becomes lower than the pressure at the side where the inner surface 30c is located. Therefore, in a period from when the air has entered between the pair of plate structures 30 until when the air flows out to the rear side of the plate structures 30, the air having entered between the pair of plate structures 30 flows from the side where the inner surfaces 30c of the plate structures 30 are located, over the upper ends of the plate structures 30 in accordance with the pressure difference, and reaches the side where the left outer surface 30d of the plate structure 30 is located and the side where the right outer surface 30d of the plate structure 30 is located, and thereafter, the air flows to the rear side of the plate structures.

Thus, when viewed in the front-rear direction, the air flow having flowed through the plate structure 30 generates the vertical vortex V in which the air flows from the outside of the plate structure 30 through the lower side of the plate structure 30 and returns to the inside of the plate structure 30. Therefore, when the air of the vertical vortex V flows upward from the region located at the inside of the plate structure 30 in the left-right direction, the pressure decrease of the wake region W of the rotor head 16 is suppressed. As a result, the pressure resistance of the rotor head 16 can be reduced.

The inner surface 30c of each plate structure 30 diagonally extends toward the inside in the left-right direction and the rear side. Therefore, in the flow field around the plate structure 30 during the forward flight of the flight vehicle 1, the stagnation point P is generated on the inner surface 30c of the plate structure 30, and the pressure at the side where the inner surface 30c of the plate structure 30 is located becomes higher than the pressure at the side where the outer surface 30d of the plate structure 30 is located. Thus, the generation of the vertical vortex V is promoted, and the pressure resistance of the rotor head 16 can be reduced.

The outer surface 30d of each plate structure 30 diagonally extends toward the inside in the left-right direction and the rear side. Therefore, in the flow field around the plate structure 30 during the forward flight of the flight vehicle 1, the flow of the air along the outer surface 30d of the plate structure 30 is made to turn diagonally, and this increases the flow velocity. As a result, the pressure at the side where the outer surface 30d of the plate structure 30 is located becomes low. Thus, the generation of the vertical vortex V is promoted, and the pressure resistance of the rotor head 16 can be reduced.

The rear ends 30b of the pair of plate structures 30 are located in front of the rotor head 16 or the rear end 16a of a rotation trajectory T of the radially outer end of the rotor head 16. Therefore, the vertical vortex V moves with the rearward flow and easily and appropriately flows to the wake region W of the rotor head 16.

When the distance L2 between the rear ends of the pair of plate structures 30 in the left-right direction is twice or more the maximum height H of the plate structure 30, the interference between the vertical vortex V generated by the right plate structure 30 and the vertical vortex V generated by the left plate structure 30 is reduced. As a result, the upward flow of the vertical vortex V can be promoted. When the distance L2 between the rear ends 30b of the plate structures 30 in the left-right direction is four times or less the maximum height of the plate structure 30, the flow of the vertical vortex V toward the wake region of the rotor head 16 can be improved.

The rear portion 13c of the top portion 13 has a shape that tapers toward the rear side. Therefore, the vertical vortexes V behind the plate structures 30 hardly hit the top portion 13 of the body 2. As a result, the upward flow of the vertical vortexes V can be promoted.

Figure 8A:
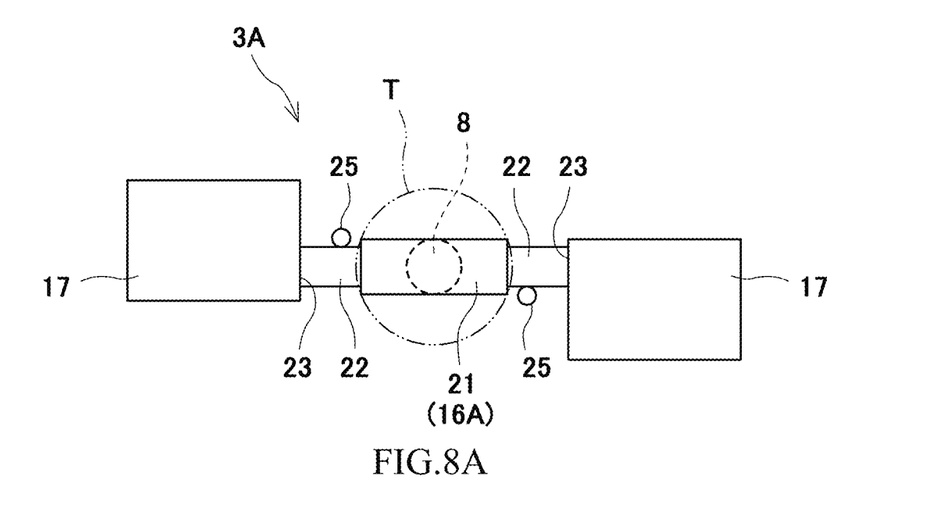
FIG. 8A is a plan view showing a first modified example of a rotor head of FIG. 1 and its vicinity.
Figure 8B:
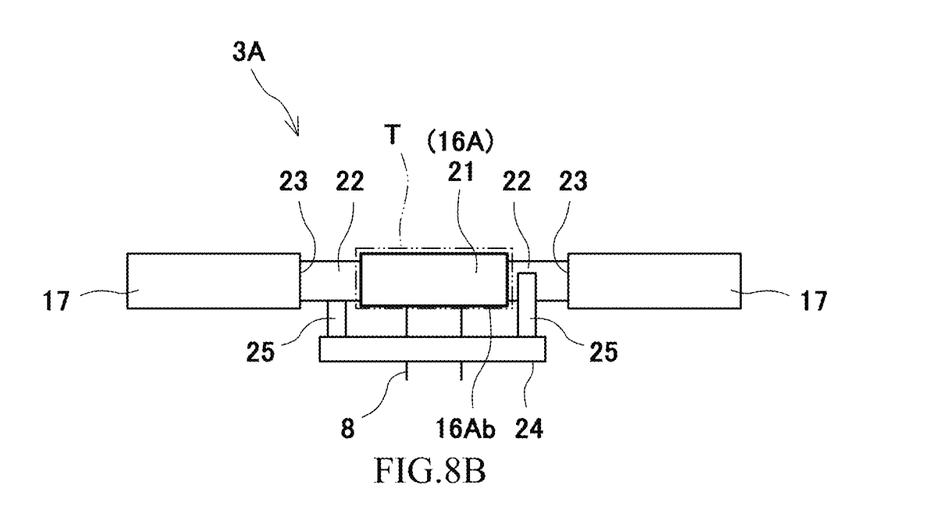
FIG. 8B is a side view showing the rotor head of FIG. 8A and its vicinity.

FIG. 8A is a plan view showing a first modified example of the rotor head 16 of FIG. 1 and its vicinity. FIG. 8B is a side view showing the rotor head 16A of FIG. 8A and its vicinity. As shown in FIGS. 8A and 8B, a main rotary wing 3A of the rotor head 16A is of a variable pitch type and does not include a hub cap. The main rotary wing 3A includes a hub 21, coupling bodies 22, flapping hinges 23, and rotor blades 17. The hub 21 is externally fitted to an upper portion of the rotor shaft 8 and rotates together with the rotor shaft 8.

Each coupling body 22 connects the rotor blade 17 to the hub 21. One end portion of the coupling body 22 is coupled to the hub 21 so as to be able to perform a pitching operation. The rotor blade 17 is connected to the other end portion of the coupling body 22 through the flapping hinge 23. A swash plate 24 is located under the hub 21. The coupling bodies 22 are coupled to the swash plate 24 through pitch links 25.

The rotor head 16A of the first modified example is the hub 21. The hub 21 performs only the rotation around the axis of the rotor shaft 8 during the flight. The coupling bodies 22, the flapping hinges 23, the swash plate 24, and the pitch links 25 perform other operations in addition to the rotation around the axis of the rotor shaft 8 during the flight. Therefore, these components are not included in the rotor head 16A. A two-dot chain line in FIGS. 8A and 8B shows the rotation trajectory T of the rotor head 16A. Moreover, a lower surface 16Ab of the rotor head 16A of the first modified example is a main surface, which faces downward, of the rotation trajectory T of the hub 21.

Figure 9A:
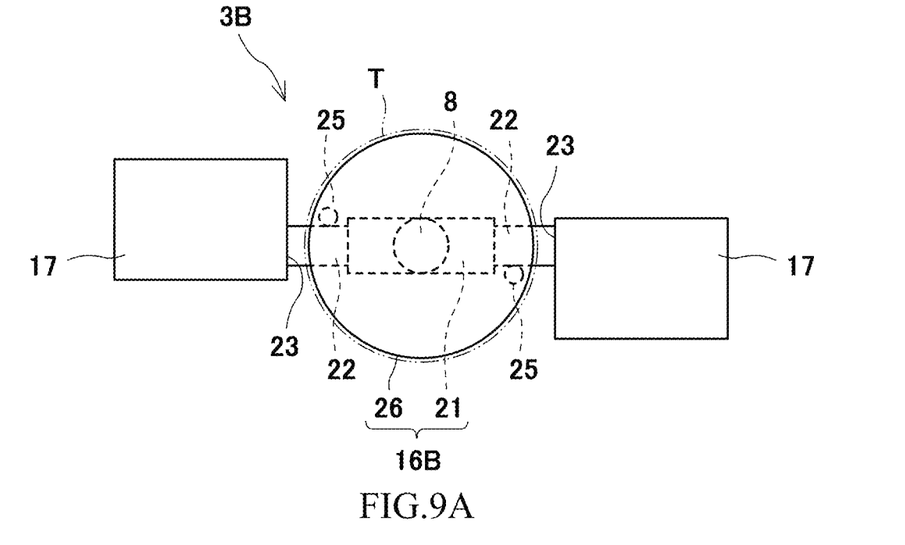
FIG. 9A is a plan view showing a second modified example of the rotor head of FIG. 1 and its vicinity.
Figure 9B:
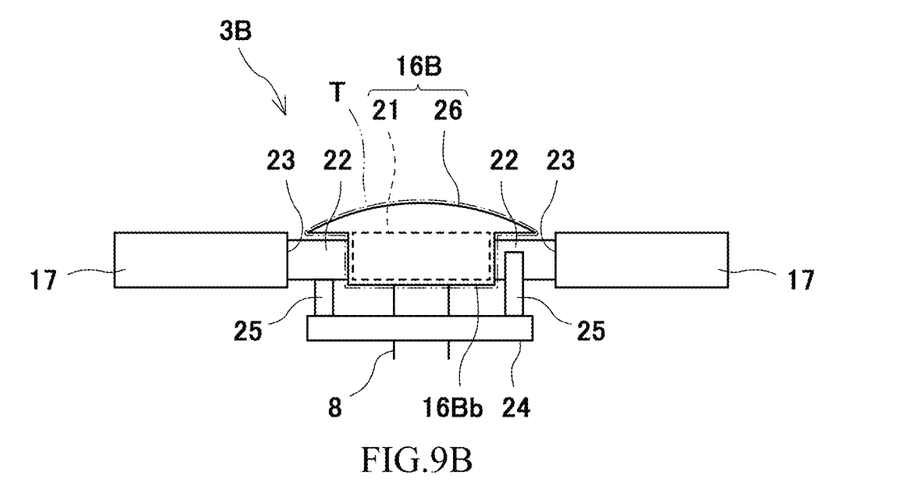
FIG. 9B is a side view showing the rotor head of FIG. 9A and its vicinity.

FIG. 9A is a plan view showing a second modified example of the rotor head 16 of FIG. 1 and its vicinity. FIG. 9B is a side view showing a rotor head 16B of FIG. 9A and its vicinity. As shown in FIGS. 9A and 9B, the main rotary wing 3B of the rotor head 16B is of a variable pitch type and includes the hub cap. The main rotary wing 3B includes the hub 21, the coupling bodies 22, the flapping hinges 23, the rotor blades 17, and a hub cap 26. The hub 21, the coupling bodies 22, the flapping hinges 23, and the rotor blades 17 are the same as those of the first modified example.

The hub cap 26 is fixed to the hub 21 so as to cover the hub 21. The rotor head 16B is an assembly including the hub 21 and the hub cap 26. The hub 21 performs only the rotation around the axis of the rotor shaft 8 during the flight. A two-dot chain line in FIGS. 9A and 9B shows the rotation trajectory T of the rotor head 16B. Moreover, a lower surface 16Bb of the rotor head 16B of the second modified example is a main surface, which faces downward, of the rotation trajectory T of the hub 21.

Figure 10A:
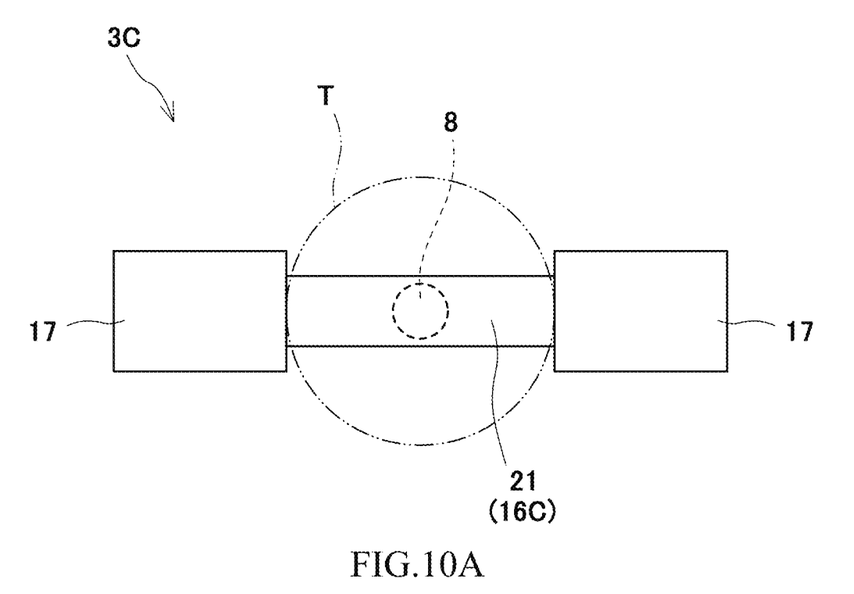
FIG. 10A is a plan view showing a third modified example of the rotor head of FIG. 1 and its vicinity.
Figure 10B:
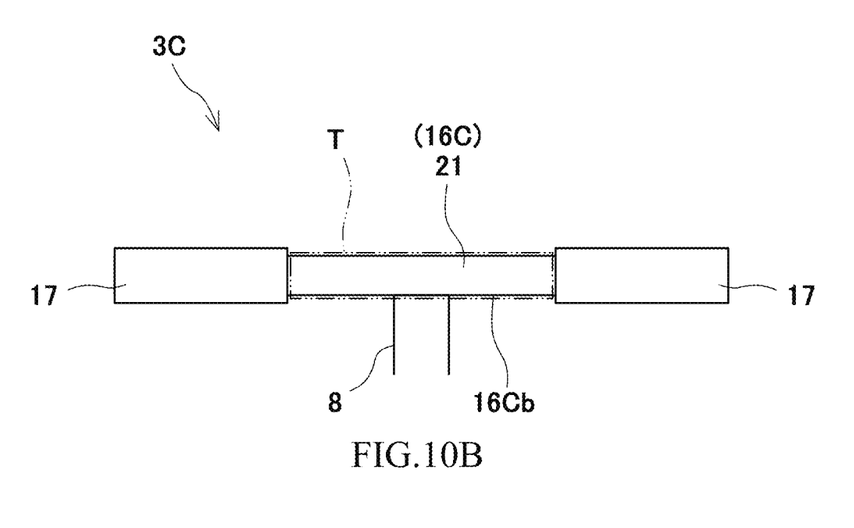
FIG. 10B is a side view showing the rotor head of FIG. 10A and its vicinity.

FIG. 10A is a plan view showing a third modified example of the rotor head 16 of FIG. 1 and its vicinity. FIG. 10B is a side view showing the rotor head 16C of FIG. 10A and its vicinity. As shown in FIGS. 10A and 10B, the main rotary wing 3 of the rotor head 16C is of a fixed pitch type. The main rotary wing 3C includes the hub 21 and the rotor blades 17. The hub 21 is externally fitted to the upper portion of the rotor shaft 8 and rotates together with the rotor shaft 8.

The rotor blades 17 are fixed to the hub 21. The rotor head 16C of the third modified example is the hub 21. The hub 21 performs only the rotation around the axis of the rotor shaft 8 during the flight. A two-dot chain line in FIGS. 10A and 10B is the rotation trajectory T of the rotor head 16C. Moreover, a lower surface 16Cb of the rotor head 16C of the third modified example is a main surface, which faces downward, of the rotation trajectory T of the hub 21.

Figure 11A:
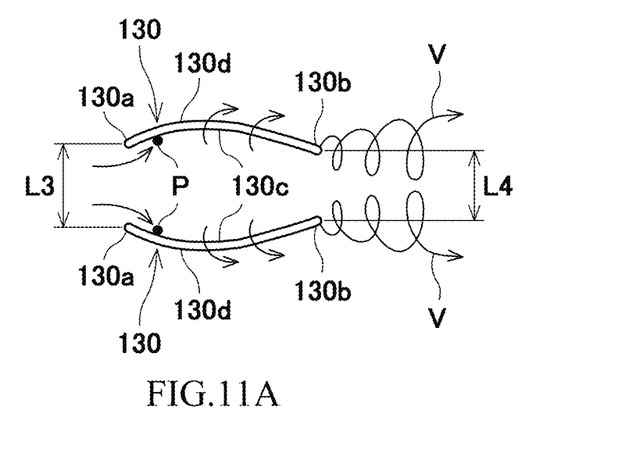
FIG. 11A is a plan view showing a first modified example of the plate structures of FIG. 3.

FIG. 11A is a plan view showing a first modified example of the plate structures 30 of FIG. 3. As shown in FIG. 11A, each of plate structures 130 of the first modified example has an arch shape that projects outward in the left-right direction. Each of rear half portions of the pair of plate structures 130 diagonally extends toward the inside in the left-right direction and the rear side. A distance L3 between front ends 130a of the pair of plate structures 130 in the left-right direction is equal to a distance L4 between rear ends 130b of the pair of plate structures 130 in the left-right direction. To be specific, the angle of attack of each plate structure 130 is zero.

The plate structure 130 has camber in a plan view. Therefore, in the flow field around the plate structure 130 during the forward flight, circulation occurs in terms of fluid dynamics, and the stagnation point P is generated on an inner surface 130c of the plate structure 130. Therefore, the pressure at a side where the inner surface 130c of the plate structure 130 is located becomes higher than the pressure at a side where an outer surface 130d of the plate structure 130 is located.

The air having entered between the pair of plate structures 130 from the front side during the forward flight flows from the side where the inner surface 130c of each plate structure 130 is located to the side where the outer surface 130d of the plate structure 130 is located, over the upper end of the plate structure 130 in accordance with the pressure difference around the plate structure 130. Thus, the vertical vortexes V are generated. As a result, the pressure resistance of the rotor head 16 is reduced.

The attack angle of each plate structure 130 of the first modified example described above does not have to be zero. For example, the distance L3 between the front ends 130a of the pair of plate structures 130 in the left-right direction may be larger than the distance L4 between the rear ends 130b of the pair of plate structures 130 in the left-right direction.

Figure 11B:
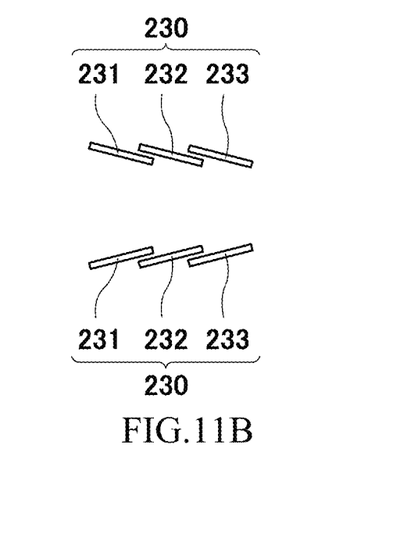
FIG. 11B is a plan view showing a second modified example of the plate structures of FIG. 3.

FIG. 11B is a plan view showing a second modified example of the plate structures 30 of FIG. 3. As shown in FIG. 11B, each of plate structures 230 of the second modified example is an assembly of plate elements 231 to 233 adjacently lined up. The assembly of the plate elements 231 to 233 has a substantially plate shape as a whole. In the present modified example, each of the plate elements 231 to 233 diagonally extends toward the inside in the left-right direction and the rear side. The plate elements 231 to 233 are located so as to be displaced from each other in the front-rear direction. The plate structure 230 diagonally extends toward the inside in the left-right direction and the rear side as a whole. In the present modified example, the plate structure 230 is divided into three plate elements 231 to 233. However, the plate structure 230 may be divided into two plate elements or four or more plate elements.

In the above embodiment, the shape of the plate structure in a side view is a rectangular shape extending in the front-rear direction. However, the above embodiment is not limited to this. The shape of the plate structure in a side view may be a trapezoidal shape, a triangular shape, a semicircular shape, or the like. In a rear view shown in FIG. 5, the plate structure is vertically attached to the top surface 13a and projects from the body 2 in the vertical direction. However, the direction in which the plate structure projects from the body 2 is not limited to this. For example, the plate structure may be inclined relative to the vertical direction in a rear view in accordance with, for example, the angle of the top surface 13a. Moreover, the plate structure may include a hole or a recess for weight reduction. The plate structure may have an airfoil shape in a plan view. Thus, during the forward flight, the pressure at the side where the outer surface of the plate structure is located becomes lower than the pressure at the side where the inner surface of the plate structure is located. The plate structure 30 may be located at the upper side of the top portion 13 and fixed to the outer surface of the top portion 13. The plate structure may be located at the upper side of the top surface 13a with a gap and supported by the top portion 13 through a bracket.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

What is claimed is:

1. A flight vehicle comprising:
a body;
a rotor shaft projecting upward from the body;
a rotor head connected to the rotor shaft at an upper side of the body; and
a pair of plate structures located at the upper side of the body and extending in a front-rear direction at right and left sides of the rotor shaft, wherein:
each of the pair of plate structures includes a front end, a rear end, an inner surface facing inward in a left-right direction, and an outer surface facing outward in the left-right direction;
the front ends of the pair of plate structures are located away from each other in the left-right direction;
the rear ends of the pair of plate structures are located away from each other in the left-right direction; and
each of the pair of plate structures has such a shape that during forward flight, pressure at a side where the outer surface is located becomes lower than pressure at a side where the inner surface is located, thereby generating a vertical vortex that flows upward from a region between the pair of plate structures and through a wake region of the rotor head to suppress a pressure decrease in the wake region.

2. The flight vehicle according to claim 1, wherein each of the inner surfaces of the pair of plate structures diagonally extends toward an inside in the left-right direction and a rear side to increase airflow velocity along the outer surface during forward flight.

3. The flight vehicle according to claim 1, wherein each of the outer surfaces of the pair of plate structures diagonally extends toward an inside in the left-right direction and a rear side.

4. The flight vehicle according to claim 1, wherein each of the pair of plate structures has an arch shape projecting outward in the left-right direction.

5. The flight vehicle according to claim 1, wherein the rear ends of the pair of plate structures are located in front of a rear end of a rotation trajectory of a radially outer end of the rotor head.

6. The flight vehicle according to claim 1, wherein a distance between the rear ends of the pair of plate structures in the left-right direction is a value that is twice or more a maximum height of the plate structure.

7. The flight vehicle according to claim 1, wherein a distance between the rear ends of the pair of plate structures in the left-right direction is a value that is six times or less a maximum height of the plate structure, such that the vertical vortex generated by each of the pair of plate structures reaches the wake region of the rotor head without interference between the vertical vortices.

8. The flight vehicle according to claim 1, wherein:
the body includes a top portion that defines an upper opening through which the rotor shaft extends; and
the top portion includes a rear portion located behind the rear ends of the plate structures, the rear portion tapering toward a rear side to promote upward flow of the vertical vortices.

9. The flight vehicle according to claim 1, wherein front ends of the plate structures are located in front of the rotor shaft, and
rear ends of the plate structures are located behind of the rotor shaft.

10. The flight vehicle according to claim 9, wherein a first distance between the front ends of the pair of plate structures in a left-right direction is longer than a second distance between the rear ends of the pair of plate structures in the left-right direction.

11. The flight vehicle according to claim 1, wherein the upper side of the body tapers in the front-rear direction.

12. The flight vehicle according to claim 7, wherein front ends of the plate structures are located in front of the rotor shaft, and
rear ends of the plate structures are located behind of the rotor shaft.

13. The flight vehicle according to claim 12, wherein a first distance between the front ends of the pair of plate structures in a left-right direction is longer than a second distance between the rear ends of the pair of plate structures in the left-right direction.

14. The flight vehicle according to claim 13, wherein the upper side of the body tapers in the front-rear direction.

* * * * *